United States Patent
Azuma et al.

(10) Patent No.: US 8,107,221 B2
(45) Date of Patent: Jan. 31, 2012

(54) DIELECTRIC CERAMIC AND CAPACITOR

(75) Inventors: Yusuke Azuma, Kagoshima (JP);
Daisuke Fukuda, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 13 days.

(21) Appl. No.: 12/447,468

(22) PCT Filed: Oct. 26, 2007

(86) PCT No.: PCT/JP2007/070919
§ 371 (c)(1),
(2), (4) Date: Jun. 1, 2009

(87) PCT Pub. No.: WO2008/050863
PCT Pub. Date: May 2, 2008

(65) Prior Publication Data
US 2010/0142120 A1    Jun. 10, 2010

(30) Foreign Application Priority Data
Oct. 27, 2006    (JP) .................................. 2006-292380

(51) Int. Cl.
*H01G 4/06* (2006.01)

(52) U.S. Cl. ............... 361/321.5; 361/321.1; 361/321.4; 361/311; 361/306.1; 361/313

(58) Field of Classification Search ............... 361/321.5, 361/311–313, 321.4, 306.1, 306.3, 321.2, 361/321.1, 301.2, 301.4
See application file for complete search history.

(56) References Cited

U.S. PATENT DOCUMENTS

| | | | |
|---|---|---|---|
| 5,268,342 | A | 12/1993 | Nishiyama et al. |
| 6,245,433 | B1 * | 6/2001 | Nakamura et al. ............. 428/469 |
| 6,319,871 | B1 * | 11/2001 | Sato et al. ..................... 501/139 |
| 6,380,116 | B1 * | 4/2002 | Okamatsu et al. ............. 501/138 |
| 6,437,969 | B2 * | 8/2002 | Mizuno et al. ................. 361/311 |
| 6,853,536 | B2 * | 2/2005 | Nakamura et al. ......... 361/321.4 |
| 7,057,876 | B2 * | 6/2006 | Fujioka et al. ............. 361/321.4 |
| 7,433,173 | B2 * | 10/2008 | Iwasaki et al. ............. 361/321.4 |
| 7,786,036 | B2 * | 8/2010 | Komatsu et al. ............. 501/139 |

FOREIGN PATENT DOCUMENTS

| | | | |
|---|---|---|---|
| JP | 01-294481 | | 11/1989 |
| JP | 05-009066 | | 1/1993 |
| JP | 08-031232 | | 2/1996 |
| JP | 01-089231 | | 4/2001 |
| JP | 2007-145649 | | 6/2007 |
| JP | 2008081350 | * | 4/2008 |

* cited by examiner

*Primary Examiner* — Nguyen T Ha
(74) *Attorney, Agent, or Firm* — Birch, Stewart, Kolasch & Birch, LLP

(57) ABSTRACT

A dielectric ceramic includes crystal grains containing barium titanate as a main component, magnesium, a rare-earth element, and manganese, wherein the crystal grains have a cubic crystal structure; and the dielectric ceramic contains, per mole of barium, 0.033 to 0.085 mol of magnesium in terms of MgO, 0.1 to 0.2 mol of the rare-earth element (RE) in terms of $RE_2O_3$, and 0.006 to 0.018 mol of manganese in terms of MnO. Such a dielectric ceramic has a high relative dielectric constant, stable temperature characteristic of the relative dielectric constant, and no spontaneous polarization.

14 Claims, 3 Drawing Sheets

US 8,107,221 B2

DIELECTRIC CERAMIC AND CAPACITOR

RELATED APPLICATIONS

This nonprovisional application is the national stage of International Patent Application No. PCT/JP2007/070919 filed in Japan on Oct. 26, 2007, which in turn claims priority under 35 USC §119 (a)-(d) of Japanese Application No. 2006-292380, filed Oct. 27, 2006. The entire contents of the above applications are hereby incorporated by reference.

TECHNICAL FIELD

The present invention relates to a dielectric ceramic and a capacitor, in particular, to a dielectric ceramic including crystal grains containing barium titanate as a main component and a capacitor including such a dielectric ceramic.

BACKGROUND ART

Digital electronic devices such as mobile computers and cellular phones are now becoming increasingly common. Digital terrestrial broadcasting will start in the near future in Japan. Examples of digital electronic devices for digital terrestrial broadcasting include liquid crystal displays and plasma displays. These digital electronic devices include a large number of LSIs.

For this reason, power source circuits of these digital electronic devices such as liquid crystal displays and plasma displays include a large number of capacitors for bypassing. When such capacitors require high capacitance, multilayer ceramic capacitors having a high relative dielectric constant (for example, see Patent Document 1) are employed. In contrast, when a temperature characteristic is more important than capacitance in such capacitors, temperature-compensating multilayer ceramic capacitors having low capacitance variation (for example, see Patent Document 2) are employed.

However, since the multilayer ceramic capacitor with a high relative dielectric constant disclosed in Patent Document 1 is constituted by crystal grains of a dielectric ceramic having ferroelectricity, such a ceramic capacitor has large temperature dependent variation of the relative dielectric constant and has large hysteresis exhibiting dielectric polarization, which has been a problem.

When a capacitor including such a dielectric ceramic having ferroelectricity is used in a power source circuit, noise caused by electrical induction distortion tends to be emitted. This hampers use of such a capacitor for plasma displays and the like.

On the other hand, temperature-compensating multilayer ceramic capacitors include dielectric ceramics mainly exhibiting paraelectricity, and hence these ceramic capacitors have low spontaneous polarization. For this reason, these ceramic capacitors have an advantage that electrical distortion typical of ferroelectricity does not occur. However, the dielectric ceramics of such ceramic capacitors have a low relative dielectric constant and hence such ceramic capacitors do not provide sufficient performance as by-pass capacitors, which has been a problem.

[Patent Document 1] Japanese Unexamined Patent Application Publication No. 2001-89231

[Patent Document 2] Japanese Unexamined Patent Application Publication No. 2001-294481

DISCLOSURE OF INVENTION

Problems to be Solved by the Invention

An object of the present invention is to provide a dielectric ceramic having a high relative dielectric constant, a stable temperature characteristic of the relative dielectric constant, and a low spontaneous polarization, and a capacitor including such a dielectric ceramic.

Means for Solving the Problems

A dielectric ceramic according to the present invention includes crystal grains containing barium titanate ($BaTiO_3$) as a main component, magnesium, a rare-earth element, and manganese, wherein the crystal grains have a cubic crystal structure; and the dielectric ceramic contains, per mole of barium, 0.033 to 0.085 mol of magnesium in terms of MgO, 0.1 to 0.2 mol of the rare-earth element (RE) in terms of $RE_2O_3$, and 0.006 to 0.018 mol of manganese in terms of MnO.

ADVANTAGES

A dielectric ceramic according to the present invention is made to contain barium titanate as a main component, magnesium, a rare-earth element, and manganese in the above-mentioned proportions and crystal grains in the dielectric ceramic are made to have a cubic crystal structure. As a result, a dielectric ceramic can be provided that has a high relative dielectric constant, a stable temperature characteristic of the relative dielectric constant, and does not have spontaneous polarization exhibiting ferroelectricity.

BEST MODE FOR CARRYING OUT THE INVENTION

Figure 1:
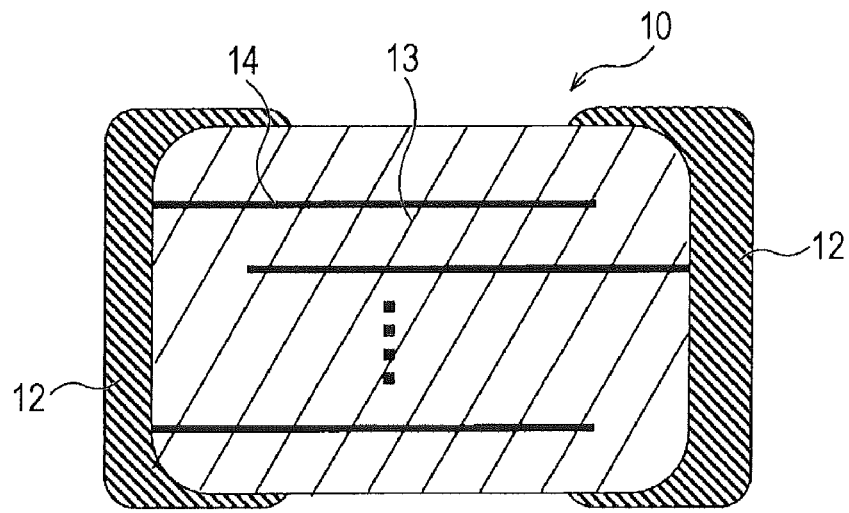
FIG. 1 is a schematic section view illustrating a capacitor according to the present invention.

A dielectric ceramic according to the present invention contains barium titanate represented by a chemical formula of $BaTiO_3$ as a main component. It is preferable that barium titanate has a cubic crystal structure of the perovskite type. Even when a dielectric ceramic contains barium titanate as a main component, such a dielectric ceramic that has a cubic crystal structure of the perovskite type exhibits paraelectricity. Thus, spontaneous polarization caused by ferroelectricity does not occur in such a dielectric ceramic.

However, spontaneous polarization occurs in a dielectric ceramic including a region exhibiting ferroelectricity no matter how small the region is. For this reason, when a capacitor including such a dielectric ceramic as dielectric layers is used in a power source circuit, noise caused by electrical distortion tends to be emitted. A crystal phase can be identified by X-ray diffraction (2θ=20° to 60°, Cu—K$_α$).

The mean diameter of crystal grains constituting a dielectric ceramic according to the present invention is not particularly restricted. It is generally preferred that this mean diameter be 100 to 145 nm. The mean diameter of crystal grains is obtained in the following manner. A section of a dielectric ceramic is polished and then etched. The areas of crystal grains are measured by image processing on the basis of the contours of the crystal grains in a micrograph taken with a scanning electron microscope (SEM). The diameters of the grains are calculated as the diameters of circles having the same areas as the grains. A mean value of the thus-obtained diameters of about 100 crystal grains is obtained as the mean diameter of the crystal grains.

A dielectric ceramic according to the present invention contains 0.033 to 0.085 mol of magnesium in terms of MgO per mole of barium constituting barium titanate. As a result, a cubic crystal structure of the perovskite type can be maintained and the Curie temperature can be shifted to a temperature range lower than room temperature. Furthermore, there are additional advantages that the relative dielectric constant of a dielectric ceramic at 25° C. can be increased to 300 or more and the temperature coefficient of the relative dielectric constant at 125° C. based on the relative dielectric constant at 25° C. can be made $-3500 \times 10^{-6}$/° C. or more, that is, the temperature coefficient can be made closer to 0 from $-3500 \times 10^{-6}$/° C.

When a dielectric ceramic contains magnesium in an amount less than 0.033 mol in terms of MgO, the Curie temperature is shifted to a higher temperature range and the temperature coefficient of the relative dielectric constant increases. When a dielectric ceramic contains magnesium in an amount more than 0.085 mol in terms of MgO, the relative dielectric constant is considerably decreased.

The temperature coefficient of the relative dielectric constant refers to the temperature coefficient of the relative dielectric constant in the temperature range of 25° C. to 125° C. Specifically, this temperature coefficient is calculated by substituting a relative dielectric constant $\in_{25}$ at 25° C. and a relative dielectric constant $\in_{125}$ at 125° C. into the following equation (1). These relative dielectric constants are values obtained by, as described below, measuring samples that are prepared by shaping a dielectric ceramic into predetermined pellets having conductor films on the surfaces, with an LCR meter 4284A at a frequency of 1.0 kHz and at an input signal level of 1.0 V at 25° C. and at 125° C. for capacitance; and calculating the measurement results, the diameter and the thickness of the pellet samples, and the area of the conductor films.

[Equation 1]

$$\text{Temperature coefficient of relative dielectric constant} = \frac{\varepsilon_{125} - \varepsilon_{25}}{\varepsilon_{25} \times (125° \text{ C.} - 25° \text{ C.})} \quad (1)$$

A dielectric ceramic according to the present invention contains 0.1 to 0.2 mol of a rare-earth element (RE) in terms of $RE_2O_3$ per mole of barium constituting barium titanate. As a result, a cubic crystal structure of the perovskite type can be maintained as in the advantage provided by the presence of magnesium described above and such a dielectric ceramic has enhanced resistance to reduction. There is an additional advantage that such a dielectric ceramic can have a high relative dielectric constant even when the Curie temperature is shifted to a temperature range lower than room temperature.

When a dielectric ceramic contains a rare-earth element (RE) in an amount less than 0.1 mol in terms of $RE_2O_3$ per mole of barium, the dielectric ceramic has degraded resistance to reduction and has an increased temperature dependent variation of the relative dielectric constant. When a dielectric ceramic contains a rare-earth element (RE) in an amount more than 0.2 mol in terms of $RE_2O_3$ per mole of barium, the dielectric ceramic has a decreased relative dielectric constant.

"Rare-earth element" in the present invention refers to one element selected from the group consisting of the rare-earth elements of the lanthanide series, which have atomic numbers ranging from 57 to 71, and yttrium (Y). In particular, the presence of Y in barium titanate is preferable since the relative dielectric constant and the insulating property can be further enhanced.

A dielectric ceramic according to the present invention contains 0.006 to 0.018 mol of manganese in terms of MnO per mole of barium constituting barium titanate. As a result, in the dielectric ceramic, resistance to reduction is enhanced, the relative dielectric constant is increased, and the temperature dependent variation of the relative dielectric constant and the temperature coefficient of the relative dielectric constant can be decreased.

When a dielectric ceramic contains both manganese in the proportion range described above and a rare-earth element, unbalanced charges caused by oxygen vacancies in crystal grains containing barium titanate as a main component can be further compensated and the resistance to reduction can be enhanced. This facilitates use of a base metal or the like for forming conductor films.

When a dielectric ceramic contains manganese in an amount less than 0.006 mol per mole of barium, or more than 0.018 mol per mole of barium, the temperature dependent variation of the relative dielectric constant and the temperature coefficient of the relative dielectric constant are increased.

In particular, a dielectric ceramic according to the present invention preferably contains, per mole of barium constituting barium titanate, 0.048 to 0.056 mol of magnesium in terms of MgO, 0.128 to 0.149 mol of the rare-earth element (RE) in terms of $RE_2O_3$, and 0.006 to 0.018 mol of manganese in terms of MnO. This composition is advantageous because the relative dielectric constant at 25° C. can be made 443 or more, the relative dielectric constant at 125° C. can be made 313 or more, and the temperature coefficient of the relative dielectric constant can be made closer to 0 from $-3194 \times 10^{-6}$/° C.

The above-described dielectric ceramic according to the present invention is represented by the following composition formula. That is, a dielectric ceramic according to the present invention is represented by $(Ba_{1-a1}RE_{a1})(Ti_{1-a2-b-c})RE_{a2}Mg_bMn_cO_3$ where $0.075 \leq a1 \leq 0.15$, $0.025 \leq a2 \leq 0.05$, $0.033 \leq b \leq 0.085$, and $0.006 \leq c \leq 0.018$. A rare-earth element preferably is solid-solved in both A site and B site in view of charge balance. In this case, a rare-earth element preferably is solid-solved in barium (Ba) site of the barium titanate in a larger amount than in titanium (Ti) site of the barium titanate. The composition is preferably adjusted such that the ratio of the number of Ba sites substituted by a rare-earth element represented by RE to the number of Ti sites substituted by the rare-earth element is about 3:1. The composition is preferably adjusted such that Mg and Mn substitute the Ti sites.

As described above, a dielectric ceramic according to the present invention contains barium titanate as a main component, magnesium, a rare-earth element, and manganese, and have a cubic crystal structure. In a dielectric ceramic according to the present invention, magnesium, a rare-earth element, and manganese uniformly is solid-solved in the entirety of crystal grains constituting the dielectric ceramic. Herein, when crystal grains mainly composed of barium titanate has a cubic crystal structure, ferroelectricity caused by a tetragonal system is suppressed and the crystal grains mainly exhibit paraelectricity. For this reason, electrical induction distortion caused by ferroelectricity can be reduced, which is advantageous. Use of such a dielectric ceramic in power source circuits reduces noise that is caused when resonance occurs in the power source circuits.

According to the present invention, a dielectric ceramic preferably has a Curie temperature of 25° C. or less, in particular, 0° C. or less. When a dielectric ceramic has a Curie temperature of 25° C. or less, the perovskite crystal structure has a cubic system in the temperature range of room temperature or more and hence the dielectric ceramic exhibits paraelectricity. The dielectric ceramic according to the present invention described above, due to its cubic crystal structure, preferably has a temperature coefficient of the relative dielectric constant of $-3500 \times 10^{-6}/°$ C. or more in the temperature range of 25° C. to 125° C. In particular, the dielectric ceramic preferably does not have spontaneous polarization exhibiting ferroelectricity even when the dielectric ceramic has a relative dielectric constant $\in_{25}$ of 300 or more. The Curie temperature described above can be determined by measuring temperature dependent variation of capacitance, for example, with an LCR meter.

Next, a capacitor according to the present invention is described. FIG. 1 is a schematic section view illustrating a capacitor according to the present invention. The following capacitor can be formed with a dielectric ceramic according to the present invention.

Specifically, as shown in FIG. 1, a capacitor according to the present invention includes external electrodes 12 at both ends of a capacitor body 10. The capacitor body 10 includes a plurality of dielectric layers 13 and a plurality of conductor layers 14 disposed alternately. The dielectric layers 13 are constituted by a dielectric ceramic according to the present invention. The conductor layers 14 function as internal electrode layers. Such a capacitor according to the present invention includes a dielectric ceramic according to the present invention, the dielectric ceramic having a high relative dielectric constant and a stable temperature characteristic of the relative dielectric constant. As a result, such a capacitor has a higher capacitance and a more stable temperature characteristic of capacitance than existing capacitors.

The dielectric layers 13 preferably have a thickness of 1 μm or more and 5 μm or less. When the dielectric layers 13 have a thickness of 5 μm or less, reduction of the thickness of the dielectric layers 13 results in an increase in the capacitance of a capacitor, which is advantageous.

The conductor layers 14 are preferably formed of a base metal such as Ni or Cu because a large number of the layers can be stacked at a reduced production cost. In particular, Ni is more preferable because the conductor layers 14 and the dielectric layers 13 constituting a capacitor according to the present invention can be fired simultaneously. The conductor layers 14 preferably have a thickness of 1 μm or less on average.

Next, a method of producing a dielectric ceramic according to the present invention is described. In a method of producing a dielectric ceramic according to the present invention, raw materials are prepared: a $BaCO_3$ powder, a $TiO_2$ powder, a MgO powder, a powder of an oxide of a rare-earth element, and a manganese carbonate powder as a manganese component for enhancing the resistance to reduction. All these powders have a purity of 99.9% or more.

These raw material powders are mixed such that the resultant mixture contains 0.033 to 0.085 mol of magnesium in terms of MgO per mole of barium, 0.1 to 0.2 mol of a rare-earth element (RE) in terms of $RE_2O_3$ per mole of barium, and 0.006 to 0.018 mol of manganese in terms of MnO per mole of barium. When these additives are mixed to satisfy the ranges described above, the above-described dielectric ceramic according to the present invention can be easily formed.

Then, the raw materials described above are wet-blended in a predetermined proportion and calcined at a temperature of 900° C. to 1100° C. to provide a calcined powder. The calcined powder is pulverized, subsequently formed into pellets, and fired in the temperature range of 1300° C. to 1500° C. at atmospheric pressure. This firing is conducted in the atmosphere or in a reducing atmosphere.

A capacitor may be produced by forming the calcined powder described above into green sheets; subsequently preparing a conductor paste that mainly contains a base metal and will form conductor layers after being fired; applying the conductor paste to the surfaces of the green sheets by printing; and subsequently stacking and firing the green sheets.

Finally, the resultant dielectric ceramic obtained by the firing is evaluated for the mean diameter of crystal grains, identification of the crystal phase, solid-solved distribution of additives, the relative dielectric constant, and the temperature coefficient of the relative dielectric constant (temperature: 25° C. to 125° C.).

Hereinafter, the present invention is described in further detail with reference to Examples; however, the present invention is not restricted to Examples below.

EXAMPLES

<Production of Dielectric Ceramic>

Dielectric ceramics were produced in the following manner. A $BaCO_3$ powder, a $TiO_2$ powder, a MgO powder, oxide powders of $Y_2O_3$, $Dy_2O_3$, $Ho_2O_3$, and $Er_2O_2$, and a manganese carbonate powder, all having a purity of 99.9% or more, were prepared. These powders were mixed in accordance with the proportions shown in Tables 1 to 5 to prepare mixed powders. The amounts shown in Tables 1 to 5 are equivalent to amounts in terms of oxides of the respective elements.

Then, the mixed powders were calcined at a temperature of 1000° C. for 2 hours to provide calcined powders. The calcined powders were pulverized and subsequently formed into pellets having a diameter of 16.5 mm and a thickness of 1 mm.

Then, a plurality of pellets for each composition were fired at a temperature of 1350° C. in a reducing atmosphere. Conductor films of indium and gallium were printed on the surfaces of the fired samples to provide dielectric ceramics (Sample Nos. 1 to 70 in Tables 1 to 5).

<Evaluation>

Ten samples each were used for evaluation and the average of ten samples was determined. Specifically, the thus-produced dielectric ceramics (samples) were measured for capacitance with an LCR meter 4284A at a frequency of 1.0 kHz and at an input signal level of 1.0 V. The measurement results, the diameter and the thickness of the samples, and the area of the conductor films were used to calculate the relative dielectric constants of the samples. The temperature coefficient of the relative dielectric constant was calculated by substituting a relative dielectric constant $\in_{25}$ at 25° C. and a relative dielectric constant $\in_{125}$ at 125° C. into the equation (1) described above.

The resultant dielectric ceramics were evaluated for the magnitude of electrical induction distortion by measuring dielectric polarization. This evaluation was conducted on the basis of the value of charge amount (residual dielectric polarization) at 0 V after the voltage was fluctuated in the range of ±1250 V.

The crystal phase was identified by X-ray diffraction (2θ=20° to 60°, Cu—K$_\alpha$).

Solid solution of Y, dysprosium (Dy), holmium (Ho), and erbium (Er) in the barium sites and the titanium sites of barium titanate was evaluated by a Rietveld method. The samples prepared on the basis of Examples were confirmed to contain Y, Dy, Ho, and Er being solid-solved in the barium site and the titanium site in accordance with the mixed compositions.

TABLE 1

| | Sample No | Ba | Y Mol | Mg Mol | Mn Mol | Ti Mol | Relative dielectric constant 25° C. | Relative dielectric constant 125° C. | Temperature coefficient of relative dielectric constant 25-125° C. ×10⁻⁶/° C. |
|---|---|---|---|---|---|---|---|---|---|
| * | 1 | 1 | 0.149 | 0.030 | 0.013 | 1.031 | 1010 | 609 | −3970 |
|   | 2 | 1 | 0.149 | 0.033 | 0.013 | 1.028 | 707 | 469 | −3366 |
|   | 3 | 1 | 0.149 | 0.048 | 0.013 | 1.013 | 602 | 437 | −2741 |
|   | 4 | 1 | 0.149 | 0.056 | 0.013 | 1.005 | 481 | 356 | −2599 |
|   | 5 | 1 | 0.149 | 0.078 | 0.013 | 0.983 | 372 | 271 | −2715 |
|   | 6 | 1 | 0.149 | 0.085 | 0.013 | 0.976 | 332 | 236 | −2892 |
| * | 7 | 1 | 0.149 | 0.090 | 0.013 | 0.971 | 289 | 219 | −2422 |
| * | 8 | 1 | 0.090 | 0.056 | 0.013 | 0.976 | 867 | 546 | −3702 |
|   | 9 | 1 | 0.100 | 0.056 | 0.013 | 0.981 | 702 | 470 | −3305 |
|   | 10 | 1 | 0.128 | 0.056 | 0.013 | 0.995 | 628 | 442 | −2962 |
|   | 11 | 1 | 0.200 | 0.056 | 0.013 | 1.031 | 364 | 247 | −3214 |
| * | 12 | 1 | 0.240 | 0.056 | 0.013 | 1.051 | 276 | 208 | −2464 |
| * | 13 | 1 | 0.149 | 0.056 | 0.003 | 1.015 | 587 | 376 | −3595 |
|   | 14 | 1 | 0.149 | 0.056 | 0.006 | 1.012 | 512 | 361 | −2949 |
|   | 15 | 1 | 0.149 | 0.056 | 0.018 | 1.000 | 467 | 337 | −2784 |
| * | 16 | 1 | 0.149 | 0.056 | 0.021 | 0.997 | 293 | 217 | −2594 |
| * | 17 | 1 | 0.060 | 0.025 | 0.013 | 0.992 | 1091 | 1941 | 7791 |

Asterisked (*) samples do not fall within the scope of the present invention.

TABLE 2

| Sample No | Ba Mol | Total of Y Mol | Y—Ba site Mol | Y—Ti site Mol | Mg Mol | Mn Mol | Ti Mol | Relative dielectric constant 25° C. | Relative dielectric constant 125° C. | Temperature coefficient of relative dielectric constant 25-125° C. ×10⁻⁶/° C. |
|---|---|---|---|---|---|---|---|---|---|---|
| 4 | 1 | 0.149 | 0.112 | 0.037 | 0.056 | 0.013 | 1.005 | 481 | 356 | −2599 |
| 18 | 1 | 0.149 | 0.130 | 0.019 | 0.056 | 0.013 | 1.043 | 784 | 511 | −3482 |
| 19 | 1 | 0.149 | 0.074 | 0.074 | 0.056 | 0.013 | 0.931 | 745 | 487 | −3463 |

TABLE 3

| | Sample No | Ba | Dy Mol | Mg Mol | Mn Mol | Ti Mol | Relative dielectric constant 25° C. | Relative dielectric constant 125° C. | Temperature coefficient of relative dielectric constant 25-125° C. ×10⁻⁶/° C. |
|---|---|---|---|---|---|---|---|---|---|
| * | 20 | 1 | 0.149 | 0.030 | 0.013 | 1.031 | 980 | 586 | −4020 |
|   | 21 | 1 | 0.149 | 0.033 | 0.013 | 1.028 | 674 | 439 | −3487 |
|   | 22 | 1 | 0.149 | 0.048 | 0.013 | 1.013 | 574 | 408 | −2892 |
|   | 23 | 1 | 0.149 | 0.056 | 0.013 | 1.005 | 464 | 338 | −2716 |
|   | 24 | 1 | 0.149 | 0.078 | 0.013 | 0.983 | 348 | 249 | −2845 |
|   | 25 | 1 | 0.149 | 0.085 | 0.013 | 0.976 | 317 | 214 | −3249 |
| * | 26 | 1 | 0.149 | 0.090 | 0.013 | 0.971 | 263 | 203 | −2281 |
| * | 27 | 1 | 0.090 | 0.056 | 0.013 | 0.976 | 843 | 526 | −3760 |
|   | 28 | 1 | 0.100 | 0.056 | 0.013 | 0.981 | 685 | 447 | −3474 |
|   | 29 | 1 | 0.128 | 0.056 | 0.013 | 0.995 | 603 | 418 | −3068 |
|   | 30 | 1 | 0.200 | 0.056 | 0.013 | 1.031 | 346 | 231 | −3324 |
| * | 31 | 1 | 0.240 | 0.056 | 0.013 | 1.051 | 251 | 192 | −2351 |

TABLE 3-continued

| | | Composition | | | | Relative dielectric constant | | Temperature coefficient of relative dielectric constant |
|---|---|---|---|---|---|---|---|---|
| Sample No | Ba | Dy Mol | Mg Mol | Mn Mol | Ti Mol | 25° C. | 125° C. | 25-125° C. ×10$^{-6}$/° C. |
| * 32 | 1 | 0.149 | 0.056 | 0.003 | 1.015 | 563 | 351 | −3766 |
| 33 | 1 | 0.149 | 0.056 | 0.006 | 1.012 | 495 | 344 | −3051 |
| 34 | 1 | 0.149 | 0.056 | 0.018 | 1.000 | 443 | 313 | −2935 |
| * 35 | 1 | 0.149 | 0.056 | 0.021 | 0.997 | 275 | 201 | −2691 |
| * 36 | 1 | 0.060 | 0.025 | 0.013 | 0.992 | 1043 | 1885 | 8073 |

Asterisked (*) samples do not fall within the scope of the present invention.

TABLE 4

| | | Composition | | | | Relative dielectric constant | | Temperature coefficient of relative dielectric constant |
|---|---|---|---|---|---|---|---|---|
| Sample No | Ba | Ho Mol | Mg Mol | Mn Mol | Ti Mol | 25° C. | 125° C. | 25-125° C.000000 ×10$^{-6}$/° C. |
| * 37 | 1 | 0.149 | 0.030 | 0.013 | 1.031 | 993 | 594 | −4018 |
| 38 | 1 | 0.149 | 0.033 | 0.013 | 1.028 | 689 | 448 | −3498 |
| 39 | 1 | 0.149 | 0.048 | 0.013 | 1.013 | 587 | 416 | −2913 |
| 40 | 1 | 0.149 | 0.056 | 0.013 | 1.005 | 473 | 343 | −2748 |
| 41 | 1 | 0.149 | 0.078 | 0.013 | 0.983 | 357 | 254 | −2885 |
| 42 | 1 | 0.149 | 0.085 | 0.013 | 0.976 | 321 | 218 | −3209 |
| * 43 | 1 | 0.149 | 0.090 | 0.013 | 0.971 | 275 | 209 | −2400 |
| * 44 | 1 | 0.090 | 0.056 | 0.013 | 0.976 | 852 | 531 | −3768 |
| 45 | 1 | 0.100 | 0.056 | 0.013 | 0.981 | 691 | 453 | −3444 |
| 46 | 1 | 0.128 | 0.056 | 0.013 | 0.995 | 613 | 423 | −3100 |
| 47 | 1 | 0.200 | 0.056 | 0.013 | 1.031 | 356 | 236 | −3371 |
| * 48 | 1 | 0.240 | 0.056 | 0.013 | 1.051 | 261 | 198 | −2414 |
| * 49 | 1 | 0.149 | 0.056 | 0.003 | 1.015 | 577 | 359 | −3778 |
| 50 | 1 | 0.149 | 0.056 | 0.006 | 1.012 | 504 | 351 | −3036 |
| 51 | 1 | 0.149 | 0.056 | 0.018 | 1.000 | 455 | 321 | −2945 |
| * 52 | 1 | 0.149 | 0.056 | 0.021 | 0.997 | 283 | 205 | −2756 |
| * 53 | 1 | 0.060 | 0.025 | 0.013 | 0.992 | 1064 | 1896 | 7820 |

Asterisked (*) samples do not fall within the scope of the present invention.

TABLE 5

| | | Composition | | | | Relative dielectric constant | | Temperature coefficient of relative dielectric constant |
|---|---|---|---|---|---|---|---|---|
| Sample No | Ba | Er Mol | Mg Mol | Mn Mol | Ti Mol | 25° C. | 125° C. | 25-125° C.000000 ×10$^{-6}$/° C. |
| * 54 | 1 | 0.149 | 0.030 | 0.013 | 1.031 | 989 | 590 | −4034 |
| 55 | 1 | 0.149 | 0.033 | 0.013 | 1.028 | 681 | 443 | −3495 |
| 56 | 1 | 0.149 | 0.048 | 0.013 | 1.013 | 581 | 409 | −2960 |
| 57 | 1 | 0.149 | 0.056 | 0.013 | 1.005 | 468 | 334 | −2863 |
| 58 | 1 | 0.149 | 0.078 | 0.013 | 0.983 | 351 | 247 | −2963 |
| 59 | 1 | 0.149 | 0.085 | 0.013 | 0.976 | 317 | 212 | −3312 |
| * 60 | 1 | 0.149 | 0.090 | 0.013 | 0.971 | 272 | 202 | −2574 |
| * 61 | 1 | 0.090 | 0.056 | 0.013 | 0.976 | 846 | 524 | −3806 |
| 62 | 1 | 0.100 | 0.056 | 0.013 | 0.981 | 683 | 447 | −3455 |
| 63 | 1 | 0.128 | 0.056 | 0.013 | 0.995 | 598 | 407 | −3194 |
| 64 | 1 | 0.200 | 0.056 | 0.013 | 1.031 | 349 | 229 | −3438 |
| * 65 | 1 | 0.240 | 0.056 | 0.013 | 1.051 | 254 | 192 | −2441 |
| * 66 | 1 | 0.149 | 0.056 | 0.003 | 1.015 | 571 | 351 | −3853 |
| 67 | 1 | 0.149 | 0.056 | 0.006 | 1.012 | 498 | 345 | −3072 |
| 68 | 1 | 0.149 | 0.056 | 0.018 | 1.000 | 448 | 315 | −2969 |
| * 69 | 1 | 0.149 | 0.056 | 0.021 | 0.997 | 276 | 198 | −2826 |
| * 70 | 1 | 0.060 | 0.025 | 0.013 | 0.992 | 1058 | 1887 | 7836 |

Asterisked (*) samples do not fall within the scope of the present invention.

The mixing compositions and the dielectric characteristics are shown in Tables 1, and 3 to 5. Herein, the mixing compositions were corresponded to a composition formula $(Ba_{1-a1}RE_{a1})(Ti_{1-a2-b-c}RE_{a2}Mg_bMn_cO_3$ where $0.075 \leq a1 \leq 0.15$, $0.025 \leq a2 \leq 0.05$, $0.03 \leq b \leq 0.085$, and $0.006 \leq c \leq 0.018$. In particular, the mixing compositions were adjusted such that the ratio of the number of Ba sites substituted by the rare-earth elements to the number of Ti sites substituted by the rare-earth elements was about 3:1 (Sample Nos. 1 to 17 and 20 to 70).

Figure 2:
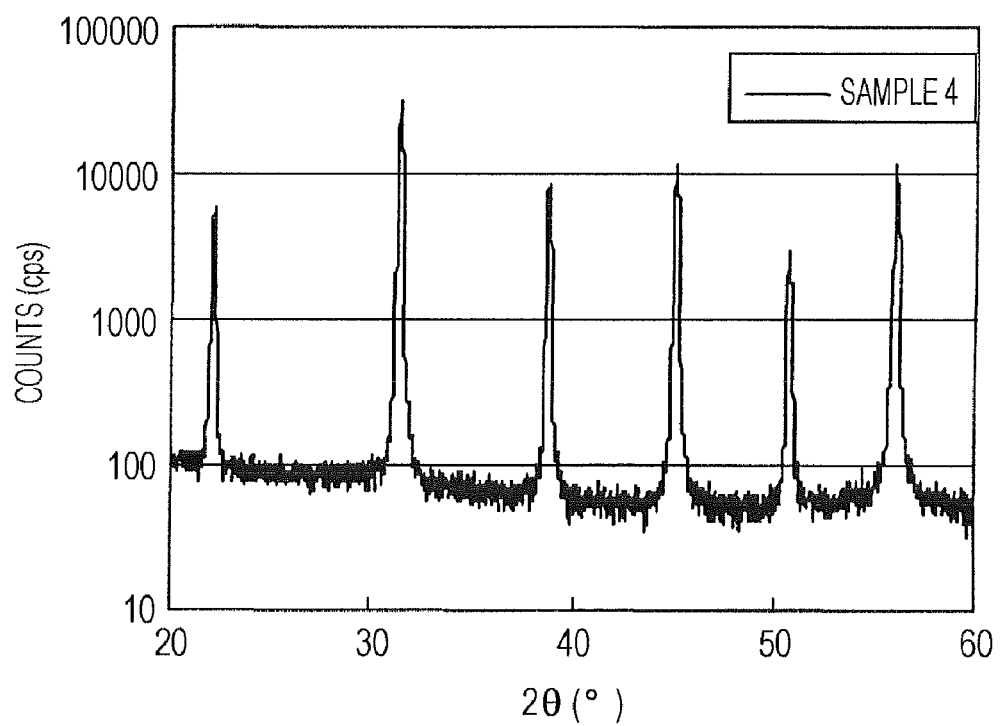
FIG. 2 is a representative example of an X-ray diffraction pattern of a dielectric ceramic according to the present invention.
Figure 3:
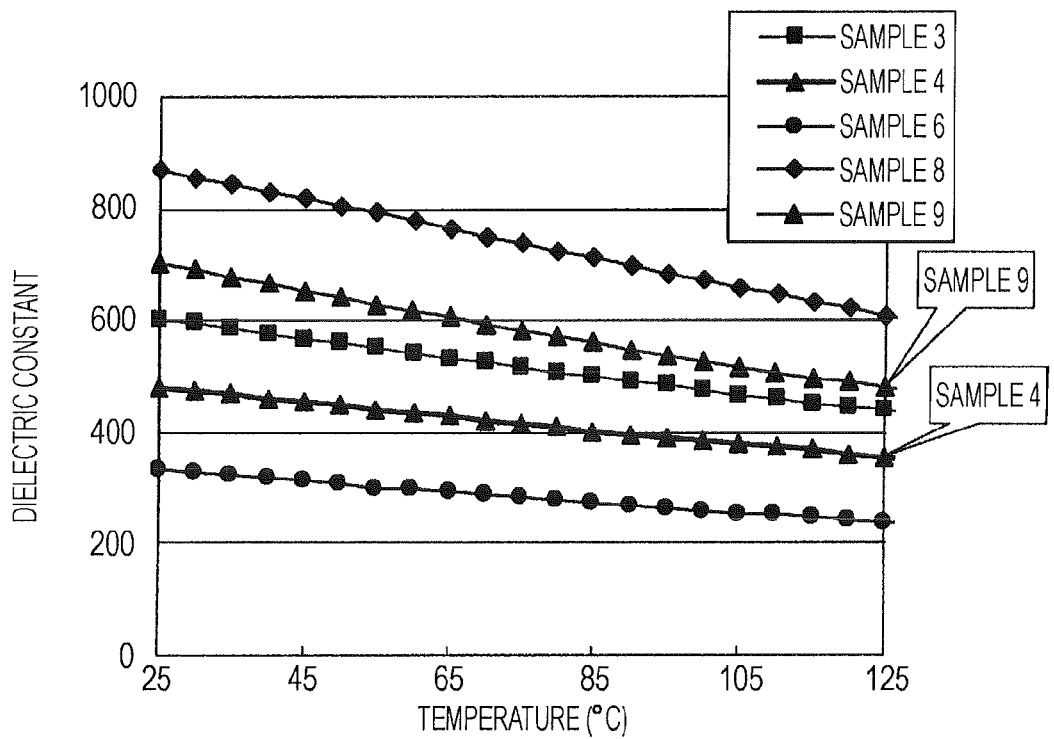
FIG. 3 is a graph illustrating variations in relative dielectric constants of dielectric ceramics (Sample Nos. 3, 4, 6, 8, and 9) according to the present invention.
Figure 4:
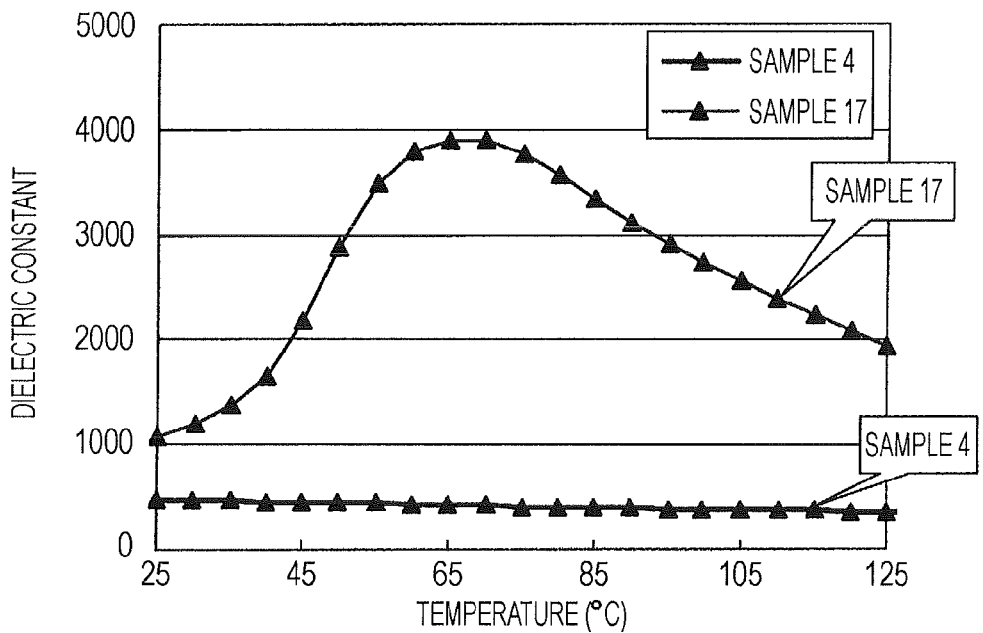
FIG. 4 is a graph illustrating variations in relative dielectric constants of dielectric ceramics (Sample Nos. 4 and 17) according to the present invention.
Figure 5:
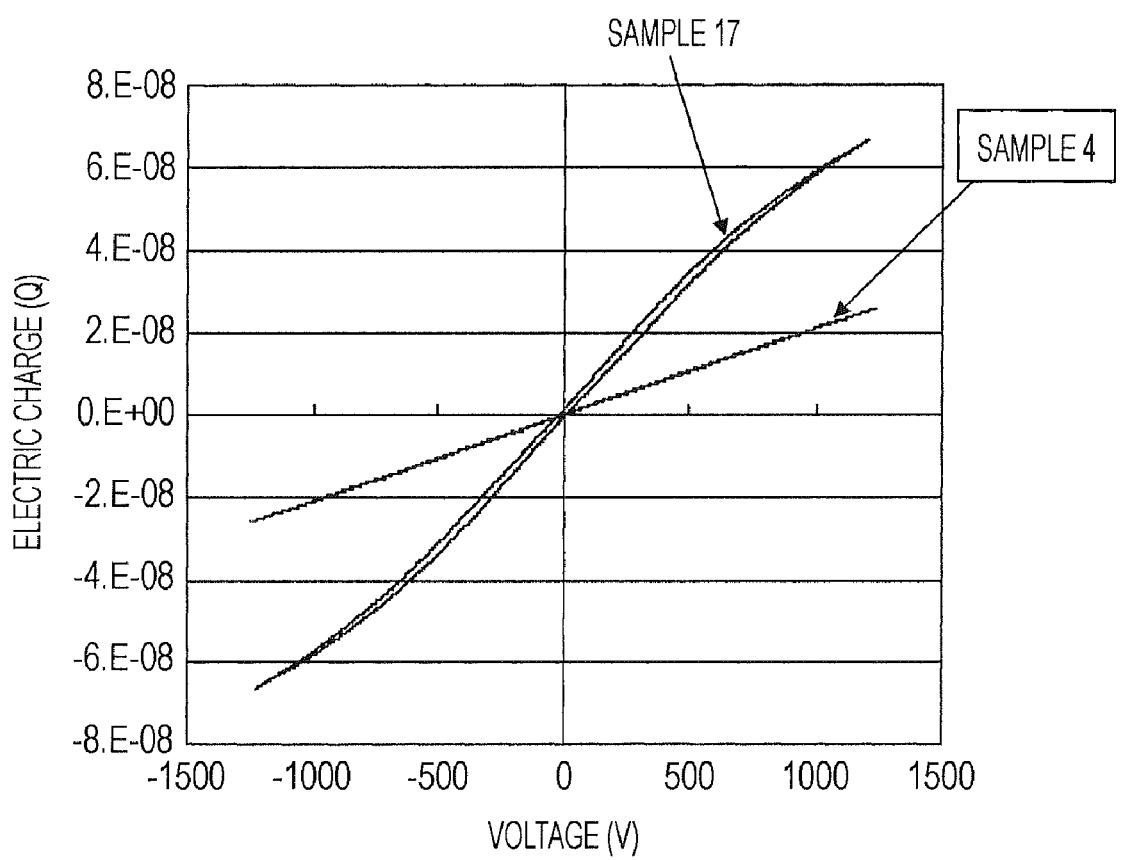
FIG. 5 is a representative example of a dielectric polarization (V-Q) characteristic of dielectric ceramics according to the present invention.

FIGS. 2, 3, 4, and 5 relate to samples randomly selected from the above-mentioned samples. FIG. 2 shows a representative example of an X-ray diffraction pattern of a dielectric ceramic (Sample No. 4) according to the present invention. FIG. 3 is a graph illustrating variations in relative dielectric constants (Sample Nos. 3, 4, 6, 8, and 9). FIG. 4 is a graph illustrating variations in relative dielectric constants (Sample Nos. 4 and 17). FIG. 5 is a representative example of a dielectric polarization (V-Q) characteristic of dielectric ceramics (Sample Nos. 4 and 17) according to the present invention. In FIG. 5, for example, "2.E-08" refers to $2 \times 10^{-8}$.

The resultant dielectric ceramics all had a cubic system by the analysis of X-ray diffraction and did not exhibit spontaneous polarization of dielectric polarization. As is obvious from the results shown in Tables 1 to 5, dielectric ceramics according to the present invention (Sample Nos. 2 to 6, 9 to 11, 14, 15, 18, 19, 21 to 25, 28 to 30, 33, 34, 38 to 42, 45 to 47, 50, 51, 55 to 59, 62 to 64, 67, and 68) had a relative dielectric constant of 300 or more at 25° C., a temperature coefficient of the relative dielectric constant of $-3500 \times 10^{-6}/°$ C. or more, and no spontaneous polarization. From these results, it was confirmed that the dielectric ceramics according to the present invention were samples having no electrical induction distortion.

In contrast, Sample Nos. 1, 20, 37, and 54 had a considerably low temperature coefficient of the relative dielectric constant of $-3970 \times 10^{-6}/°$ C. or less due to insufficient amounts of magnesium. Sample Nos. 7, 26, 43, and 60 had a low relative dielectric constant of 289 or less at 25° C. due to excessive amounts of magnesium.

Sample Nos. 8, 27, 44, and 61 had a considerably low temperature coefficient of the relative dielectric constant of $-3700 \times 10^{-6}/°$ C. or less due to smaller amounts of the rare-earth elements (Y, Dy, Ho, and Er) than those of the scope of the present invention. Sample Nos. 12, 31, 48, and 65 had a low relative dielectric constant of 276 or less at 25° C. due to larger amounts of the rare-earth elements than those of the scope of the present invention.

The samples containing manganese in an amount that did not fall within the scope of the present invention also had a considerably low temperature coefficient of the relative dielectric constant of $-3500 \times 10^{-6}/°$ C. or less (Sample Nos. 13, 32, 49, and 66) and a relative dielectric constant of 300 or less at 25° C. (Sample Nos. 16, 35, 52, and 69).

Sample Nos. 17, 36, 53, and 70 that had low contents of the rare-earth elements (Y, Dy, Ho, and Er) and magnesium (Mg) exhibited ferroelectricity.

As shown in Table 2, the composition of Sample No. 18 was adjusted such that the ratio of the number of Ba sites substituted by the rare-earth element to the number of Ti sites substituted by the rare-earth element was about 7:1; and the composition of Sample No. 19 was adjusted such that the ratio of the number of Ba sites substituted by the rare-earth element to the number of Ti sites substituted by the rare-earth element was about 1:1. In both of these cases, the relative dielectric constant increased and the temperature coefficient of the relative dielectric constant was $-3500 \times 10^{-6}/°$ C. or less. Therefore, good characteristics were achieved when the ratio of the number of Ba sites substituted by the rare-earth element to the number of Ti sites substituted by the rare-earth element was 3:1.

The invention claimed is:

1. A dielectric ceramic comprising:
   barium titanate;
   magnesium at a concentration in terms of MgO in a range of about 0.033 mol to about 0.085 mol per mole of barium;
   a rare-earth element at a concentration in terms of $RE_2O_3$ in a range of about 0.1 mol to about 0.2 mol per mole of barium;
   manganese at a concentration in terms of MnO in a range of about 0.006 mol to about 0.018 mol per mole of barium; and
   a plurality of crystal grains comprising the barium titanate as a main component, the magnesium, the rare-earth element, and the manganese, wherein the crystal grains have a cubic crystal structure.

2. The dielectric ceramic according to claim 1, wherein the rare-earth element is solid-solved in barium sites of the barium titanate in a larger amount than in titanium sites of the barium titanate.

3. The dielectric ceramic according to claim 2, wherein a ratio of a number of barium sites substituted by the rare-earth element to a number of the titanium sites substituted by the rare-earth element is about 3:1.

4. The dielectric ceramic according to claim 3, wherein the magnesium and the manganese substitute titanium sites.

5. The dielectric ceramic according to claim 1 wherein the plurality of crystal grains have a structure of a perovskite type.

6. The dielectric ceramic according to claim 1, wherein
   the concentration of the magnesium in terms of MgO is in a range of about 0.048 mol to about 0.056 mol per mole of barium; and
   the concentration of the rare-earth element in terms of $RE_2O_3$ is in a range of about 0.128 mol to about 0.149 mol per mole of barium.

7. A capacitor, comprising:
   a dielectric ceramic comprising:
   barium titanate;
   magnesium at a concentration in terms of MgO in a range of about 0.033 mol to about 0.085 mol per mole of barium;
   a rare-earth element at a concentration in terms of $RE_2O_3$ in a range of about 0.1 mol to about 0.2 mol per mole of barium;
   manganese at a concentration in terms of MnO in a range of about 0.006 mol to about 0.018 mol per mole of barium;
   a plurality of crystal grains comprising the barium titanate as a main component, the magnesium, the rare-earth element, and the manganese, wherein the crystal grains have a cubic crystal structure;
   at least one dielectric layer comprising the dielectric ceramic; and
   at least one conductor layer.

8. The capacitor according to claim 7, wherein the rare-earth element is solid-solved in barium sites of the barium titanate in a larger amount than in titanium sites of the barium titanate.

9. The capacitor according to claim 8, wherein a ratio of a number of barium sites substituted by the rare-earth element to a number of titanium sites substituted by the rare-earth element is about 3:1.

10. The capacitor according to claim 8, wherein magnesium and manganese substitute the titanium sites.

11. The capacitor according to claim 7, wherein
   the concentration of the magnesium in terms of MgO is in a range of about 0.048 mol to 0.056 about mol per mole of barium; and the concentration of the rare-earth element in terms of $RE_2O_3$ in a range of about 0.128 mol to about 0.149 mol per mole of barium.

12. The capacitor according to claim 7, wherein the at least one conductor layer comprises at least one of nickel and copper.

13. The capacitor according to claim 7, wherein a thickness of the at least one dielectric layer is at least about 1 μm and at most about 5 μm.

14. The capacitor according to claim 7, wherein an average thickness of the at least one conductor layer is at most about 1 μm.

* * * * *